US012568284B2

(12) United States Patent
Nilsson et al.

(10) Patent No.: US 12,568,284 B2
(45) Date of Patent: Mar. 3, 2026

(54) CONTENT DELIVERY

(71) Applicant: British Telecommunications Public Limited Company, London (GB)

(72) Inventors: Michael Nilsson, London (GB); Stephen Appleby, London (GB); Timothy Stevens, London (GB); Rory Turnbull, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/695,241

(22) PCT Filed: Sep. 20, 2022

(86) PCT No.: PCT/EP2022/076045
§ 371 (c)(1),
(2) Date: Mar. 25, 2024

(87) PCT Pub. No.: WO2023/052190
PCT Pub. Date: Apr. 6, 2023

(65) Prior Publication Data
US 2024/0276069 A1     Aug. 15, 2024

(30) Foreign Application Priority Data
Sep. 29, 2021     (GB) ..................................... 2113880

(51) Int. Cl.
*H04N 21/6405*     (2011.01)
*H04N 21/6371*     (2011.01)
*H04N 21/647*     (2011.01)

(52) U.S. Cl.
CPC ..... *H04N 21/6405* (2013.01); *H04N 21/6371* (2013.01); *H04N 21/64738* (2013.01)

(58) Field of Classification Search
CPC ......... H04N 21/26616; H04N 21/6405; H04N 21/6408
See application file for complete search history.

(56) References Cited

U.S. PATENT DOCUMENTS 9,065,700 B2 *   6/2015   Horn ................... H04L 65/1026
9,374,410 B2     6/2016   Mantin
(Continued)

FOREIGN PATENT DOCUMENTS

EP          1187488          3/2002
EP          3435616 B1       7/2020
(Continued)

OTHER PUBLICATIONS

Combined Search and Examination Report for GB2113880 5, dated Feb. 8, 2022, 5 pages.
(Continued)

*Primary Examiner* — Mulugeta Mengesha
(74) *Attorney, Agent, or Firm* — Nixon & Vanderhye P.C.

(57)          ABSTRACT

A method of managing content delivery to a client device via a proxy is described. The proxy starts off by receiving content requests from the client device over unicast, and fulfils those requests by forwarding them to a content server, and receiving that content before forwarding onto the client device. At some stage, the proxy determines that it may be possible to join a multicast channel to more efficiently receive the required content. However, before a switch is made, the proxy gathers multicast delivery timing data from the content server without joining the multicast group, and behavioural characteristics of the client device. The proxy uses this data to determine whether the client device would change the quality level of the content segments being requested.

14 Claims, 2 Drawing Sheets

(56) References Cited

U.S. PATENT DOCUMENTS

| | | | |
|---|---|---|---|
| 10,484,441 B2 | 11/2019 | Kotecha et al. | |
| 10,523,572 B2 | 12/2019 | Li et al. | |
| 10,630,746 B1 | 4/2020 | Shen | |
| 10,735,823 B2 | 8/2020 | Harden et al. | |
| 11,553,018 B2 * | 1/2023 | Mao | H04L 65/762 |
| 2004/0078392 A1 | 4/2004 | Morita | |
| 2005/0015808 A1 | 1/2005 | Nakamura | |
| 2007/0147411 A1 | 6/2007 | Bijwaard et al. | |
| 2009/0232143 A1 | 9/2009 | Li | |
| 2010/0131992 A1 | 5/2010 | Kenmotsu | |
| 2011/0080950 A1 | 4/2011 | Toyota | |
| 2015/0358692 A1 | 12/2015 | Markovitz | |
| 2016/0182966 A1 | 6/2016 | Hao et al. | |
| 2016/0294898 A1 | 10/2016 | Wheelock | |
| 2017/0251034 A1 * | 8/2017 | Schmidt | H04L 65/80 |
| 2019/0260816 A1 | 8/2019 | Bradbury et al. | |
| 2020/0059683 A1 | 2/2020 | Grigsby et al. | |
| 2020/0107062 A1 * | 4/2020 | Pichaimurthy | H04N 21/6408 |

FOREIGN PATENT DOCUMENTS

| | | | |
|---|---|---|---|
| JP | 2005064583 A | 3/2005 | |
| JP | 2007184913 | 7/2007 | |
| WO | 2014155041 A1 | 10/2014 | |
| WO | 2017125150 A1 | 7/2017 | |

OTHER PUBLICATIONS

Combined Search and Examination Report for GB2113881 3, dated Jun. 23, 2022, 10 pages.

Anonymous, "IP Multicast Adaptive Bit Rate Architecture Technical Report", Nov. 12, 2024, 69 pages, retrieved from the Internet at URL: https://community.cablelabs.com/wiki/plugin s/servlet/cablelabs/alfresco/download?id=51b3c11a-3ba4-40abb234-42700eOd4669.

International Search Report and Written Opinion of the ISA for PCT/EP2022/076045, mailed Jan. 23, 2023, 13 pages.

International Search Report and Written Opinion of the ISA for PCT/EP2022/076046, mailed Jan. 18, 2023, 13 pages.

De Mi, et al., "Demonstrating Immersive Media Delivery on 5G Broadcast and Multicast Testing Networks", IEEE Transactions on Broadcasting, downloaded Mar. 25, 2024, 16 pages.

Niels Bouten et al., "An Autonomic Delivery Framework for HTTP Adaptive Streaming in Multicast-enabled Multimedia Access Networks", *2012 IEEE/IFIP 5th Workshop on Distributed Autonomous Network Management System (DANMS)*, 2012.

International Preliminary Report on Patentability and Written Opinion of the International Searching Authority dated Apr. 11, 2024, issued for International Application No. PCT/EP2022/076045 (8 pages).

International Preliminary Report on Patentability and Written Opinion of the International Searching Authority dated Apr. 11, 2024, issued for International Application No. PCT/EP2022/076046 (6 pages).

Office Action dated May 29, 2025 issued for U.S. Appl. No. 18/695,755 (13 pages).

Communication pursuant to Article 94(3) EPC dated Oct. 24, 2025, issued for European Application No. 22 793 130.0 (4 pages).

* cited by examiner

100

102

104

106

110

112

114

Key

102 Content Source
104 Content Encoder
106 Multicast Transmitter
110 Unicast Server
112 Proxy
114 Client Device Content Production Bi-directional unicast Uni-directional multicast

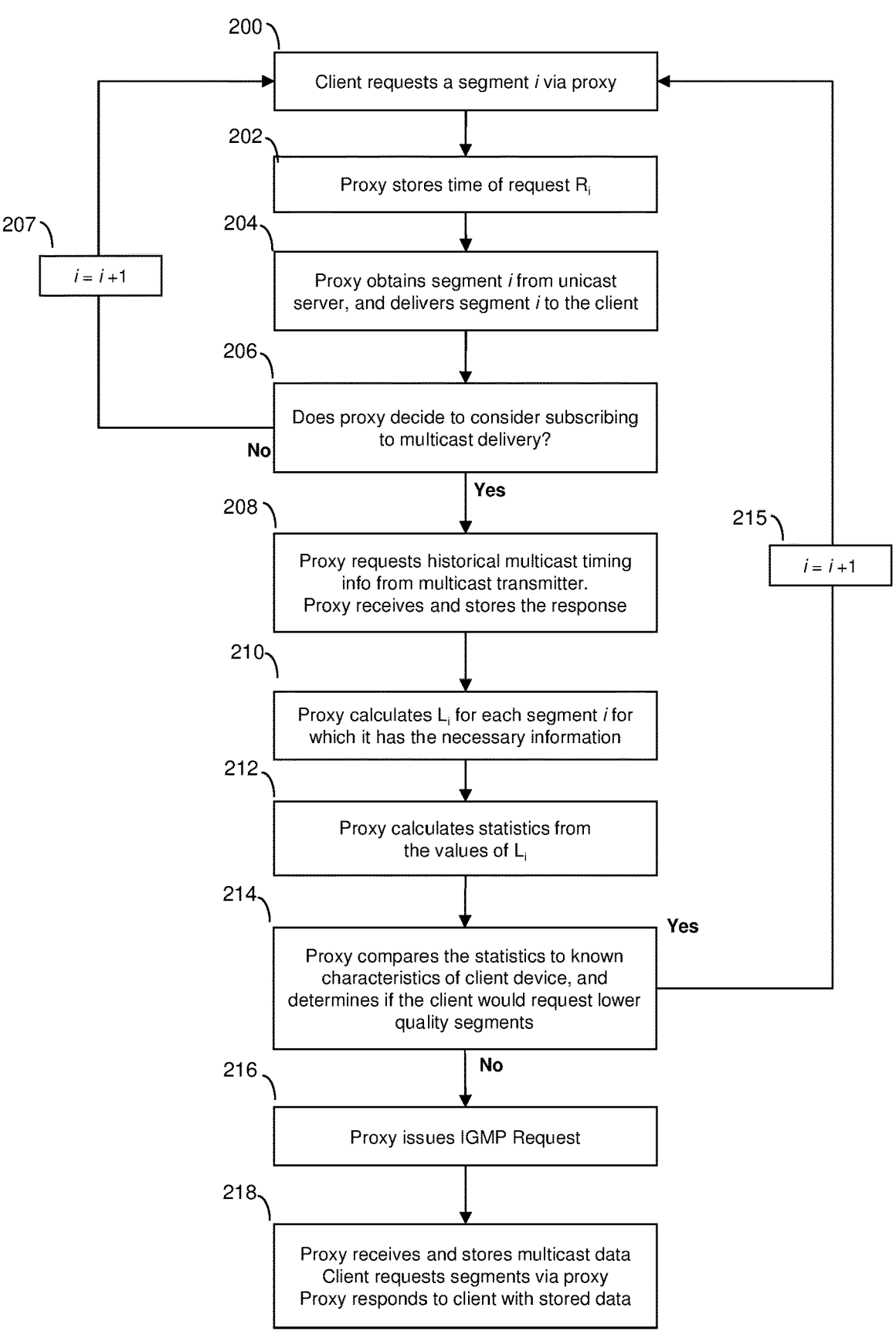

200

Client requests a segment *i* via proxy

202

Proxy stores time of request R$_i$

207

*i* = *i* +1

204

Proxy obtains segment *i* from unicast server, and delivers segment *i* to the client

206

Does proxy decide to consider subscribing to multicast delivery?

No

Yes

208

Proxy requests historical multicast timing info from multicast transmitter.
Proxy receives and stores the response

215

*i* = *i* +1

210

Proxy calculates L$_i$ for each segment *i* for which it has the necessary information

212

Proxy calculates statistics from the values of L$_i$

214

Proxy compares the statistics to known characteristics of client device, and determines if the client would request lower quality segments

Yes

No

216

Proxy issues IGMP Request

218

Proxy receives and stores multicast data
Client requests segments via proxy
Proxy responds to client with stored data

Figure 2

CONTENT DELIVERY

CROSS-REFERENCE TO RELATED APPLICATIONS

This application is the U.S. national phase of International Application No. PCT/EP2022/076045 filed Sep. 20, 2022, which designated the U.S. and claims priority to GB 2113880.5 filed Sep. 29, 2021, the entire contents of each of which are hereby incorporated by reference.

FIELD OF THE INVENTION

This invention relates to the field of managing content delivery in a network, in particular managing content delivery using a combination of unicast and multicast.

BACKGROUND TO THE INVENTION

Video content is currently delivered to a range of client devices using unicast delivery, where a single stream of data is transmitted to each individual client device. Web (HTTP) technology is used for the content delivery, where the content is segmented into short segment files, typically around six to ten seconds in duration, enabling each segment file to be requested by and delivered to the client device using HTTP.

Each segment may also be encoded at a set of quality levels, each with a different bit rate and hence different file size. The client device monitors its buffer level and the network throughput achieved, and determines from these at which quality to request the next segment in order to achieve a good compromise between media quality and timely delivery. This is commonly referred to as adaptive bitrate (ABR) streaming.

However, HTTP is delivered over unicast (one to one) transport, so is inefficient for delivering the same content at the same time to many client devices. Multicast (one to many) transport would be far more efficient. Yet multicast is currently rarely used for any services other than network operators' on-net linear video channels delivered to their own set-top boxes. The main reason for this is that multicast does not lend itself to open use on the Internet.

To bring the benefits of multicast scalability to HTTP-based Internet media streaming, a class of techniques known as Multicast-Adaptive Bitrate (m-ABR) is being investigated and standardised.

Multicast-Adaptive Bitrate (m-ABR) is a relatively new technology. It aims to allow more efficient delivery of ABR content over networks by enabling the use of multicast for content streams where many clients are requesting the same content at about the same time.

One ambition of many m-ABR systems is to deploy multicast and enable m-ABR without any change to the client device and the client application that are already supporting HTTP (unicast) streaming. This can be achieved using a hybrid approach that uses a combination of both multicast and unicast delivery, where a proxy is inserted between the client device and the content server. The proxy can inspect content requests from the client device, and when appropriate, subscribe to a multicast stream, receive multicast content, and provide this content to the client, packaged to look like unicast delivered content.

Examples of such hybrid solutions include: "IP Multicast Adaptive Bit Rate Architecture Technical Report" OC-TR-IP-MULTI-ARCH-C01-161026, 26 Oct. 2016, by Cable Labs; 3GPP specifications, 23.246 (MBMS Architecture and functional description), 26.346 (MBMS Protocols and codecs) and 26.347 (MBMS APIs); and DVB "Adaptive Media Streaming over IP Multicast" ETSI TS 103 769 V1.1.1 (2020-11).

Problems can occur when switching from unicast to multicast delivery in current hybrid solutions.

One problem is that some client devices may make unicast requests for content segments before the data of those content segments have been fully delivered on the multicast channel to the proxy. In such cases the proxy cannot complete delivery of the content segment over unicast to the client device until the entire content segment has been received on the multicast channel.

This slow or delayed delivery of content to the client device, which is behaving as a normal ABR streaming device, may cause the client device to change the quality level of the content segments being requested, as the slow delivery of content segments would be seen as indicative of a slow network connection. This then in turn makes the data being received at the proxy over multicast unsuitable (it is at the wrong quality level) to satisfy the new requests made by the client device, which may cause the proxy to leave the multicast channel and return to satisfying the requests from the client device by obtaining the data by unicast.

Some solutions currently available prevent the client device from adapting to a different quality level by signalling that the content is only available at a single bit rate. However, this gives a poor user experience with interruptions to the presentation of content at the client device when data is not delivered over the network in time. Such interruptions may cause the presentation of content to stall and/or some content not to be presented at all.

In short, problems can occur when trying to switch to from unicast delivery to multicast delivery when the content segments made available on the multicast channel are not provided soon enough after they are requested by the client device. This can happen when, in effect, the multicast channel is providing segments that are behind those that are available over unicast.

SUMMARY OF THE INVENTION

It is the aim of examples of the present invention to provide an improved content delivery mechanism that addresses one or more of the above problems.

According to one example of the invention, there is provided a method of managing content delivery to a client device by a network element as set out in claim 1.

Deciding to join the multicast channel in dependence on the calculated intervals may comprise comparing the intervals to a threshold.

Deciding to join the multicast channel in dependence on the calculated intervals may comprise performing statistical analysis on the intervals, and comparing result to a threshold.

The threshold may be dependent on characteristics associated with the client device.

According to a further example of the invention, there is provided a network element for managing content delivery to a client device as set out in claim 5.

Examples of the invention cover methods that do not require the proxy to join the multicast stream to determine whether the timing of the multicast stream relative to the timing of client requests would cause the client to adapt if multicast delivery were used. The invention ensures that the proxy only joins the multicast stream when it is possible to use that stream to deliver content to the client device in a timely manner.

If a proxy were to join a multicast stream over a bandwidth constrained network, and then be unable to deliver the content received by multicast to the client device using unicast without the client device adapting to a lower quality encoding, a significant fraction of the network bandwidth from the proxy to the content source would be wasted with multicast traffic, possibly forcing the client device to adapt to an unnecessarily low level of video quality.

BRIEF DESCRIPTION OF THE DRAWINGS

For a better understanding of the present invention reference will now be made by way of example only to the accompanying drawings, in which:

FIG. 2 is a flow chart summarising the steps of an example of the invention.

DESCRIPTION OF PREFERRED EMBODIMENTS

The present invention is described herein with reference to particular examples. The invention is not, however, limited to such examples.

Examples of the present invention provide a method of managing content delivery to a client device by a proxy, where the content is made up of a sequence of content segments. The proxy starts off by receiving content requests from the client device over unicast, and fulfilling those requests by forwarding them to a content server, and receiving that content before forwarding onto the client device. At some stage, the proxy determines that it may be possible to join a multicast channel to more efficiently receive the required content.

However, some client devices may make unicast requests for content segments before the data of those content segments have been fully delivered on the multicast channel. This may cause content segments to be delivered to the client device later than if the proxy had obtained those content segments from the content server using unicast. This slow or delayed delivery of content to the client device may cause the client device to change the quality level of the content segments being requested as described earlier.

Therefore, in examples of the invention, a multicast join command is not issued immediately by the proxy when a decision is made to utilise multicast. Instead, the proxy determines whether, in the event of data being received at the proxy by multicast and then delivered to the client device in response to the requests from the client device, the client device would change the quality level of the content segments being requested. This may be done by the proxy considering multicast timing data together with behavioural characteristics of the specific client device.

If the proxy consequently determines that delivering data received by multicast would not cause the client device to request further content segments at a different (lower) quality level, the proxy can then take action to join the multicast channel, such as by issuing an IGMP join request. The proxy then delivers that content received over multicast to the client device formatted as unicast responses.

Figure 1:
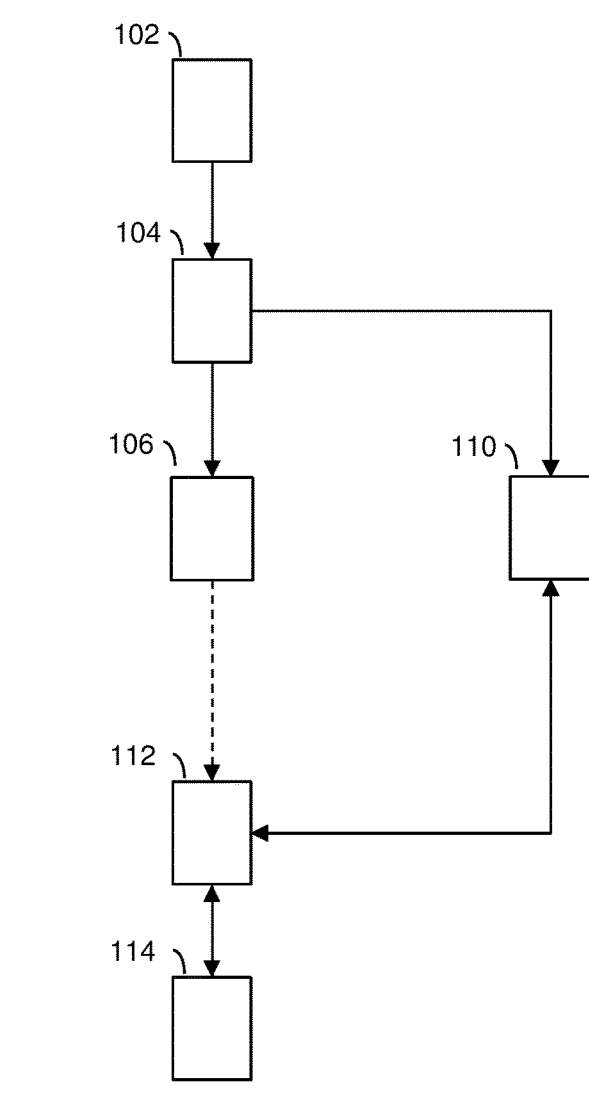
FIG. 1 system diagram showing the main components of an example of the present invention.
Figure 1:
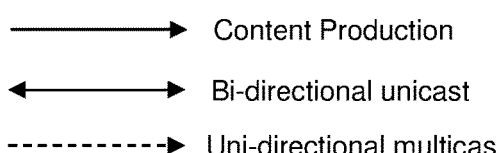

FIG. 1 shows an adaptive bit rate (ABR) streaming system 100 comprising the main components of an example of the invention. The system 100 comprises a content source 102, a content encoder 104, a multicast transmitter 106, a unicast content server 110, a proxy 112 and a client device 114. The content source 102 provides content, such as a live sports or TV broadcast, in the form of video sequences to the content encoder 104.

The proxy 112 may be located within a device such as a home gateway or router.

The client device 114 is assumed to be running a client application, which is the source of content requests. For simplicity, the term client device has been used to refer to a client device running a client application.

The content encoder 104 receives the content from the content source 102 and encodes it using a suitable compression scheme, such as ITU-T Recommendation H.264 for video content, and segments the encoded content into a sequence of content segments, each content segment typically of duration 2 to 10 seconds. The content encoder 104 also encodes the content at one or more quality levels or bit rates, resulting in one or more (at each quality level) encoded content segments corresponding to each uncompressed content segment. Such an arrangement is typical of an adaptive bit rate streaming service.

The content encoder 104 passes the encoded content segment data, encoded at all of the required bit rates, to the unicast server 110 where the data is stored and made available for delivery by unicast. The unicast server 110 responds to unicast requests for content segments with unicast responses using the stored data.

The content segments encoded at one quality level, corresponding to one encoded bit rate, are passed to the multicast transmitter 106 for transmission by multicast to any devices that have subscribed to the respective multicast channel. However, the invention is not limited to this case, and also applies when content segments encoded at a plurality of quality settings, corresponding to a plurality of encoded bit rates, are passed to the multicast transmitter 106 for transmission by multicast on a plurality of multicast channels (one channel per quality setting).

The multicast transmitter 106 may start to transmit content segments before, at the same time, or after they have been made available on the unicast server 110. The multicast transmitter 106 may transmit content segments at a constant bit rate, approximately equal to their encoding rate, to fully utilise the multicast channel. However, the unicast server 110 may be able to deliver content segments at a higher bit rate, and hence complete the delivery of a content segment to a client device 114 or proxy 112 before the same content segment has been fully delivered on the multicast channel, even when transmission of the content segment started on the multicast channel before delivery by unicast from the unicast server 110 started.

The multicast transmitter 106 may be configured in one of various modes of operation.

In one mode of operation, the unicast server 110 monitors the requests for content segments made by a plurality of client devices. When the unicast server 110 determines that a sufficient number of client devices have requested the same content segment at about the same time, it instructs the multicast transmitter 106 to transmit the content segment on the multicast channel, in the expectation that it would subsequently be requested by additional client devices. The multicast transmitter 106 obtains the content segment from the unicast server 110 and converts the content segment data into a format suitable for multicast delivery, and then transmits it on the multicast channel to all devices that have subscribed to that multicast stream.

In another mode of operation, the multicast transmitter 106 is configured for specific content, such as a television channel, at a specific encoding quality level. Content segments encoded at the specific quality setting, corresponding to one encoded bit rate, are passed from the content encoder 104 to the multicast transmitter 106 for transmission by multicast to all the devices that have subscribed to the respective multicast source. The multicast transmitter 106 may be configured to take account of buffering requirements on the plurality of proxies that receive the multicast data and store content segments until requested by client devices. When data is delivered by multicast significantly before it has been requested by a large number of client devices, each associated proxy must buffer the multicast data. To reduce overall system storage requirements, the multicast transmitter 106 is configured to delay the transmission of a content segment by multicast for a short period of time, such as a few seconds, relative to the time at which the content segment is made available on the unicast server 110 to align the timing of the delivery of content segments by multicast more closely with the timing of the requesting of the content segments by the client devices, to reduce the storage requirements of the proxy.

However, the invention is not limited to these two configurations of the multicast transmitter 106.

Regardless of which configuration of multicast transmitter 106 is used, some client devices may request content segments before they have been fully delivered on the multicast channel.

To request content segments, the client device 114 can first obtain a manifest file from the unicast server 110. Manifest files are used by client devices to identify where content segments are located (by a URL in the manifest). The client device 114 can then request these content segments in sequence using HTTP requests from the unicast server 110, and concatenate them to form a continuous stream of content segments for playback. As each content segment is available on the unicast server 110 at a plurality of encoded bit rates, the client device 110 determines for each content segment, the encoded bit rate (quality) at which to request it, taking into account such factors as the available network throughput and how much data is already received and buffered at the client device awaiting play-out.

Some HTTP requests made by the client device 114 for content will not make use of multicast delivery and are sent directly to the unicast server 110, which delivers the requested content by unicast. Other requests for content from the client device 114 that may benefit from multicast delivery are re-directed to, or simply intercepted by, the proxy 112, and can be handled in accordance with the examples described below.

The proxy 112 can be inserted in the HTTP path using any of a number of well-known techniques, such as using an HTTP redirection from the unicast server 110. In this case, the unicast server 110 would be configured such that requests for potentially popular content are not served directly but instead redirected to a suitable proxy. For example, instead of supplying a normal response, the unicast server 110 could respond with an HTTP status code 307 which indicates a temporary redirect. This invites the client device 114 to make a new request to the new URL supplied by the unicast server 110 in its response, thus enabling requests to be made to the proxy 112. This technique allows the unicast server 110 and the proxy 112 to exist in different domains, which would often be the case.

Other mechanisms to insert the proxy 112 in the HTTP path include: proxy configured as a transparent proxy (though all requests are intercepted by it, and only works with unencrypted traffic); proxy configured as a forward proxy (where the client device sends its requests directly to the proxy by virtue of being explicitly configured to do so); DNS hijacking (where a DNS server is configured to supply the IP address of the proxy for domains of interest); and manifest manipulation (where the manifest file is re-written so that requests are made directly to the proxy).

The client device 114 could request and receive content segments from the unicast server 110 from the start to the end of a streaming session. However, in some cases the proxy 112 determines that multicast delivery could be used to receive some content segments.

The proxy 112 monitors unicast content requests from the client device 114 and is aware of when content requested by the client device 114 could be received by multicast.

The proxy 112 determines whether it is possible to satisfy the client device's requests for content using data that could be delivered by multicast. If so, the proxy 112 joins the relevant multicast channel at an appropriate time. After receiving data by multicast, the proxy 112 replies to the client device's requests for unicast content with content received by multicast, but packaged as unicast content responses.

The client device 114 does not need to be aware of the proxy 112 and does not need to be aware of whether content is being delivered by unicast from the unicast content source via the proxy, or is delivered by multicast to the proxy which then delivers the content to the client device 114 in a unicast format.

There are many ways in which the proxy 112 may determine it is possible to satisfy the client device's requests for content using data that could be delivered by multicast.

For example, if client device 114 has made a plurality of consecutive requests for content segments at the same encoding quality level, that quality level is available by multicast delivery, and each of these content segments has been delivered in less time than the content segment period.

In another example, the proxy 112 may ignore the fact that some content segments have taken more time than a content segment period to be delivered, provided that many content segments are delivered in much less than a content segment period. The proxy 112 may also ignore some variations in the quality at which content segments are requested, if for much or all of the time there is easily sufficient network throughput to deliver content segments at the quality level available by multicast.

In typical systems, when the proxy 112 has decided to satisfy the client device's requests for content using data that could be delivered by multicast, the proxy 112 stops forwarding the client device's requests for content to the unicast server 110, and instead takes appropriate action to join and obtain from the multicast channel, the data requested by the client device 114. The proxy 112 then delivers that content received over multicast to the client device 114, with the data formatted as a unicast response.

However, such an approach that does not take into account the relative timing of requests from the client device 114 for content segments and the delivery of those content segments by multicast, can result in problems.

If a client device 114 makes a request for a content segment before the data of that content segment has been fully delivered on the multicast channel, the proxy 112 cannot complete delivery of that content segment to the client device until the entire content segment has been received on the multicast channel. The minimum time in which the proxy 112 could fully respond to the request from the client device 114 is the time between the client device 114 making the request and the time the content segment is fully delivered by multicast added to any additional time required to forward the content segment to the client device 114.

This constraint on the timing of the delivery of content segment data to the client device 114, which is behaving as a normal ABR streaming device, may cause it to run out of data and presentation of content to stall, or it may cause it to change the quality level of the content segments being requested, as the slow delivery of content segments would be seen as indicative of a slow network connection. This then in turn makes the data being received at the proxy 112 over multicast unsuitable (it is at the wrong quality level) to satisfy the new requests made by the client device 114, which may cause the proxy 112 to leave the multicast channel and return to satisfying the requests from the client device 114 by obtaining the data by unicast.

Described now is an example of how content can be delivered in an improved manner.

The proxy 112 determines that a multicast channel could be joined as described above. However, instead of issuing a command to join (such by an IGMP join request) the multicast channel immediately, the proxy 112 considers the relative timing of the requests for content segments from the client device 114 and the transmission of those content segments on the multicast channel. The proxy 112 determines whether any data received by multicast could be delivered to the client device 114, in response to requests for content segments, in sufficiently short periods of time that the client device 114 would not request further content segments at a different (lower) quality level. The proxy 114 can do this by considering multicast timing data together with behavioural characteristics of the specific client device 114.

If the proxy 112 determines that delivering data received by multicast in response to requests for content segments would not cause the client device 114 to request further content segments at a different (lower) quality level, the proxy 112 can then take action to join the multicast channel, such as by issuing an IGMP join request.

The proxy 112 stops forwarding the client device's requests for content to the unicast server 110, and instead receives the data requested by the client device 114 on the multicast channel. The proxy 112 then delivers that content received over multicast to the client device 114, with the data formatted as unicast responses.

The specific manner in which the proxy can determine if data received by multicast could be delivered to the client device 114 without causing the client device 114 to request further content segments at a different (lower) quality level will now be described in more detail.

For each of a set of content segments requested by the client device 114, the proxy 112 stores the time, $R_i$, at which it receives the request for the content segment with index i.

For some or all of the content segments for which it has stored the times, $R_i$, that the client device 114 made the requests for the content segments, the proxy 112 requests from the multicast transmitter 106 the times, $M_i$, at which transmission of the content segments completed on the multicast channel. The proxy 112 receives and stores the response from the multicast transmitter 106.

If the response from the multicast transmitter 106 does not include one or more values of $M_i$, for which the proxy 112 has stored the time, $R_i$, of the content segment request made by the client device 114, the proxy 112 may estimate the missing values of $M_i$. It may do this by methods including linear extrapolation of the value of $M_i$ of an earlier content segment, linear interpolation between values of $M_i$, the averaging of various linear extrapolations or interpolations, or any other suitable method. Such linear extrapolation and linear interpolation could for example make use of the assumption that values of $M_i$ are approximately uniformly spaced in time at intervals of the segment period. For example, a value of $M_i$ could be extrapolated from the value of $M_{i-1}$ as shown below, where T is the content segment period.

$$M_i = M_{i-1} + T \qquad (1)$$

For some or all of the requested content segments where there is stored both the time $R_i$ that the client device 114 made the request for the content segment, and the time $M_i$ at which transmission of the content segment completed on the multicast channel, the proxy 112 determines a time interval, $L_i$, in which it could have fully satisfied the request for the content segment from the client device 114, if it had received the data by multicast. The proxy 112 calculates this time interval, $L_i$, as the difference between the time that transmission of the content segment completed on the multicast channel, $M_i$, and the time of the request, $R_i$, from the client device 114.

$$L_i = M_i - R_i \qquad (2)$$

The proxy 112 may also calculate an overall worst case bound B on the time to respond to requests from the client device 114 for content segments as the largest observed value of $L_i$.

$$B = {}_i\max L_i \qquad (3)$$

The proxy 112 may then use knowledge of the behaviour characteristics of the specific client device 114 to determine whether this overall worst case bound, B, on the time to respond to requests from the client device 114 for content segments would cause the client device 114 to adapt to requesting content segments at a lower level of quality or not. If so, the proxy 112 decides not to join the multicast channel, and instead continues to provide responses to the requests for content segments from the client device 114 by making unicast requests to the unicast server 110 and forwarding the responses to the client device 114. Otherwise, the proxy 112 joins the multicast channel, stores data received on the multicast channel and responds to requests for content segments from the client device 114 using the stored data.

Rather than only using the overall worst case bound, B, on the time to respond to requests from the client device 114 for content segments, the proxy 112 may consider the whole set of calculated values of the time interval, $L_i$, in which it could respond to the requests for content segments, to make the decision of whether to join the multicast channel or not.

For example, the proxy 112 may use the mean of the set of values $L_i$, the median, a specific percentile, or any other derived statistic or set of statistics in a comparison with the behaviour characteristics of the specific client device 114 to determine whether to join the multicast channel or not.

Alternatively, the proxy 112 may choose not to use behaviour characteristics of the specific client device 114, and instead compare the overall worst case bound, B, the whole set of calculated values of the time interval, $L_i$, or any derived statistic or set of statistics, with one or more generic client device characteristics or thresholds.

The proxy 112 may determine the behaviour characteristics of the client device 114 by firstly identifying detailed information about the client device 114 and then looking up the behaviour characteristics in a pre-calculated database, indexed using the detailed information.

The detailed information about the client device 114 may include information relating to the hardware used, such as a specific model of mobile phone or television, the version of software running on the hardware, and the type and version of the client application. The proxy 112 may obtain this information by processing the user-agent field of the HTTP request header of requests made by the client device 114 for content segments.

The pre-calculated database of behaviour characteristics could be populated using a combination of one or more techniques. For example, analysis could be performed on the implementation of the algorithm used on a specific client device to make decisions of which quality level to request content segments at. Instead, or in addition, tests could be performed by inserting a network element between a client device and a content server and configuring the network element to limit the bandwidth of the connection between the client device and the content server in a time varying fashion. For example, the bandwidth could be slowly decreased until the client device switched to requesting segments at a lower quality level, or the bandwidth could be decreased for a short period of time to allow the effect of one or a small number of segments being delivered with a longer delivery time to be determined.

In the case that the requests for content segments from the client device 114 are uniformly distributed in time, at intervals of the content segment period, and the times at which the transmission of content segments on the multicast channel completes are uniformly distributed in time, at intervals of the content segment period, all values of $L_i$ are identical, and use of only the overall worst case bound, B, may be sufficient for good decision making.

However, in practice, requests for content segments from the client device 114 may not be uniformly distributed in time. Also, the times at which the transmission of content segments on the multicast channel complete may not be uniformly distributed in time, for example in the case of the multicast channel having a constant bit rate approximately equal to the average encoded bit rate of the content segments and all content segments not being represented with the same number of encoded bits.

In such cases all values of $L_i$ are unlikely to be identical, and there may be benefit in the consideration of more than one value. This may especially be true, for example, when a single value of $L_i$ is much larger than the others, as some client devices may be resilient to a single content segment with a long delivery time and not immediately switch to requesting content segments encoded at a lower level of quality.

If the client device 114 receives a requested content segment less than one segment period after requesting that segment, it may not request the next content segment until one segment period after making its previous request for a segment. This may be because it only needs one segment of content every segment period to achieve continuous media playout, and/or because for live or broadcast content, a new segment may only become available every segment period. A client device 114 that consistently receives requested content segments within one segment period of requesting them may therefore make requests for content segments at regular intervals of the segment period.

However, if the client device 114 receives a requested content segment more than one segment period after requesting that segment, it may not request the next content segment until that previous content segment has been fully received. This allows the full network capacity to be used for the delivery of the previous content segment. If subsequent content segments are delivered in less time than the segment period, the client device 114 may try to revert to making requests for content segments at regular intervals of the segment period with the same timing as it would have done if no segment were delivered in more time than the segment period. But if subsequent content segments are not delivered in less time than the segment period, the client device 114 may make a request for each subsequent content segment immediately after delivery of the previous content segment completed. In this case, the timing of the requests for content segments by the client device 114 is dependent on the timing of the responses to its earlier requests.

In the description above, the time, $R_i$, of the requests for content segments from the client device 114, were the times of past requests that were satisfied by unicast delivery and hence were not influenced by the timing of the delivery of content segments on the multicast channel. As stated above, the timing of requests for content segments by the client device 114 may be influenced by the timing of the responses to the requests, if the time taken to satisfy one or more requests is longer than the segment period.

For example, if a content segment index (i−1) were delivered to the client device 114 after having been received by the proxy 112 on the multicast channel, and the time, $M_{i-1}$, of completing this delivery were later than the time of completing the delivery had unicast delivery been used instead, the client device 114 may issue a request for the next content segment, index i, not at time $R_i$, but at the time $M_{i-1}$, if that time is later, as the client device may choose not to make a request for the next content segment, index i, until the immediately preceding content segment, index (i−1), has been fully delivered.

In this case, while the client device 114 may try to get back to requesting subsequent content segments the appropriate number of content segment periods after requesting an earlier content segment, it may at times be limited by the timing of the delivery of content segments on the multicast channel, if it were receiving data from the multicast channel via the proxy 112.

The proxy 112 may therefore choose to calculate values of $R_i$, based on the time $R_0$ at which an earlier content segment, index 0, was requested, and the time, $M_{i-1}$, at which the transmission of the previous content segment, index (i−1), finished on the multicast channel. The proxy 112 calculates a value of $R_i$ as the later of i content segment periods after $R_0$ and $M_{i-1}$. The first of these terms is when the client device 114 may have requested the next content segment if all i content segments since the time $R_0$ had been delivered in a time less than or equal to i content segment periods, while the second is the earliest time that the client device 114 could request the next content segment if it waits for the immediately preceding content segment to be delivered using multicast before requesting the next content segment. This is shown below where T is the content segment period.

$$R_i = \max(R_0 + iT, \ M_{i-1}) \qquad (4)$$

The proxy 112 may then calculate values $L_i$ and B from this calculation of $R_i$, and use these calculated values as described above.

FIG. 2 shows a flow chart summarising the steps of an example of the present invention, and largely mirrors the methods already described.

Starting at step 200, the client device 114 makes a request for a content segment, here segment i, stored at the unicast server 110. The proxy 112 intercepts this request, and forwards the request to the unicast server 110.

In step 202 the proxy 112 stores the time, $R_i$, that the client device 114 made the request for the content segment.

In step 204, the proxy 112 receives the requested content segment i by unicast from the unicast server 110, and forwards this data to the client device 114 as a unicast response to the request from the client device 114. The client device 114 receives this content segment, which can then be played out.

The client device 114 can request content segments using HTTP GET requests, which are unicast in nature, directed to content segments encoded at a particular bit rate. This initial or first bit rate may be chosen to be the lowest bit rate available, or the bit rate could be chosen in some other way, such as based on historical data or user preference. Each HTTP GET request includes the URL of where that content segment can be retrieved from. The URLs are found in the manifest file associated with the content.

In step 206, the proxy 112 decides whether to consider subscribing to multicast delivery. This decision can be made dependent on many factors, including whether the client device 114 has been requesting content that is available by multicast, whether the quality level of content segments requested by the client device 114 are being delivered by multicast, whether the client device 114 has been requesting only content segments at this quality level for some time, and whether the proxy 112 considers there to be sufficient bandwidth to the client device 114 to maintain timely delivery of content segment data at this quality level.

If the proxy 112 decides to consider subscribing to multicast delivery, flow passes to step 208. Otherwise flow passes back to step 200 via step 207, where the segment number is incremented by setting i=+1, and the proxy 112 continues to receive and respond as before to unicast requests for further segments from the client device 114.

In step 208, the proxy 112 requests timing information from the multicast transmitter 106. Specifically, for some or all of the content segments for which the proxy 112 has stored times $R_i$ that the client device 114 made the requests for the content segments, the proxy 112 requests from the multicast transmitter 106 the times, $M_i$, at which transmission of the content segments completed on the multicast channel. The proxy 112 receives and stores the response from the multicast transmitter 106.

If the response from the multicast transmitter 106 does not include one or more values of $M_i$, for which the proxy 112 has stored the time, $R_i$, of the content segment request made by the client device 114, the proxy 112 may estimate the missing values of $M_i$ as described above using methods including linear extrapolation and linear interpolation.

In step 210, for some or all of the requested content segments for which it has stored both the time $R_i$ and the time $M_i$, the proxy 112 determines a time interval, $L_i$, in which it could have fully satisfied the request for the content segment from the client device 114, if it had received the data by multicast. The proxy 112 calculates this time interval, $L_i$, as the difference between the time that transmission of the content segment completed on the multicast channel, $M_i$, and the time of the request, $R_i$, from the client device 114.

$$L_i = M_i - R_i \qquad (5)$$

Alternatively, instead of using the stored values of $R_i$, the proxy 112 may consider calculating values of $R_i$ to use in this equation, derived from one or more of the stored values of $R_i$. The proxy 112 may choose to do this because some of the stored values of $R_i$, of the requests for content segments from the client device 114 were influenced by those requests being satisfied by unicast delivery and were not influenced by the timing of the delivery of content segments on the multicast channel. If a content segment had been received by the proxy 112 by multicast and then delivered to the client device 114 by unicast, delivery of that content segment to the client device 114 could not complete any earlier than the time at which delivery on the multicast channel completed. The client device 114 may choose not to make a request for a next content segment until the immediately preceding content segment has been fully delivered.

In this case, while the client device 114 may try to get back to requesting content segments the appropriate number of content segment periods after requesting a first content segment, it may at times be limited by the timing of the delivery of content segments on the multicast channel, if it were receiving data from the multicast channel via the proxy 112.

The proxy 112 may therefore choose to calculate values of $R_i$, based on the time $R_0$, at which an earlier content segment, index 0, was requested, and the time, $M_{i-1}$, at which the transmission of the previous content segment, index (i−1), finished on the multicast channel. The proxy 112 calculates a value of $R_i$ as the later of i content segment periods after $R_0$ and $M_{i-1}$. The first of these terms is when the client device 114 may have requested the next content segment if all i content segments since time $R_0$ had been delivered in a time less than or equal to i content segment periods, while the second is the earliest time that the client device 114 could request the next content segment if it waits for the immediately preceding content segment to be delivered using multicast before requesting the next. This is shown below where T is the content segment period.

$$R_i = \max(R_0 + iT, M_{i-1}) \qquad (6)$$

The proxy 112 may then calculate values $L_i$ from these calculated values of $R_i$.

In step 212, the proxy 112 calculates statistics from the values of $L_i$. These may include an overall worst case bound, B, on the time to fully satisfy requests from the client device 114 for content segments. This bound B can be calculated as the largest observed value of $L_i$ as follows:

$$B = {}_i\max L_i \qquad (7)$$

The proxy 112 may calculate other statistics from the set of values $L_i$, such as the mean, the median, a specific percentile, or may calculate any other derived statistic or set of statistics.

In step 214, the proxy 112 determines if receiving data from the multicast channel and using this data to respond to requests from the client device 114 for content segments would have caused the client device 114 to request further content segments at a lower quality level (lower encoded bit rate). It can determine this by comparing the calculated time intervals for the delivery of content segments, $L_i$, or any or all of the statistics derived from these values with known parameters characterising the operation of the client device 114 in regard to how it determines at which quality (encoded bit rate) to request each content segment.

As an example, the proxy 112 may compare B, the largest observed value of $L_i$, with the content segment period, T, to determine whether the client device 114 would request further content segments at a lower quality level (lower encoded bit rate). In the example equation below, the client device 114 is known to need to receive a content segment in less than 70% of a content segment period to avoid switching to requesting lower quality content segments:

$$\text{Switch to requesting lower quality content segments if: } B \geq 0.7\,T \quad (8)$$

Similarly, the proxy 112 may instead, or in addition, compare the mean value of $L_i$, normalised by the content segment period, T, to a threshold. Or the proxy 112 may use any one or any combination of the derived statistics to determine whether the client device 114 would switch to requesting lower quality content segments.

If the proxy 112 determines that the client device 114 would request further content segments at a lower quality level (lower encoded bit rate), flow passes to step 200 via step 215, where the segment number is incremented by setting i=+1, and the proxy 112 continues to receive and respond as before to unicast requests from the client device 114. Otherwise, flow passes to step 214.

In step 216, the proxy 112 initiates the process of joining the multicast channel. This may be done for example by issuing an IGMP Join request.

In step 218, the proxy 112 receives data on the multicast channel and stores that data. The client device 114 makes requests for content segments stored at the unicast server 110. The proxy 112 intercepts these requests and responds to the client device 114 with unicast responses including data that had been received and stored in earlier steps. This data may have been received at the proxy 112 by unicast delivery or by multicast delivery on the multicast channel. The content segments are received by the client device 114, and can then be played-out.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing delivery of content to a client device by a proxy, said content comprising a sequence of segments, said method comprising:
    i) receiving requests for segments from a client device, wherein each request has an associated request time;

ii) requesting one or more of the requested segments from a unicast content source, receiving the one or more requested segments by unicast, and transmitting the received segments to the client device by unicast;

iii) determining a delivery time that each requested segment has been delivered over a multicast channel from a multicast transmitter, wherein the delivery time is determined using delivery time information obtained from the multicast transmitter;

iv) calculating an interval between the request time and the delivery time associated with each segment;

v) deciding to join the multicast channel in dependence on the calculated intervals, and joining the multicast channel; and vi) receiving requests for further segments from the client device, receiving the further segments over the multicast channel, and transmitting the requested further segments to the client device over unicast.

2. A method according to claim 1, wherein deciding to join the multicast channel in dependence on the calculated intervals comprises comparing the intervals to a threshold.

3. A method according to claim 1, wherein deciding to join the multicast channel in dependence on the calculated intervals comprises performing statistical analysis on the intervals, and comparing result to a threshold.

4. A method according to claim 2, wherein the threshold is dependent on characteristics associated with the client device.

5. A proxy for managing delivery of content to a client device, said content comprising a sequence of segments, and said proxy adapted in operation to:
    receive requests for segments from a client device, wherein each request has an associated request time;
    request one or more of the requested segments from a unicast content source, receive the one or more requested segments by unicast, and transmit the received segments to the client device by unicast;
    determine a delivery time that each requested segment has been delivered over a multicast channel, wherein the delivery time is determined using delivery time information obtained from a multicast transmitter;
    calculate an interval between the request time and the delivery time associated with each segment;
    decide to join the multicast channel in dependence on the calculated intervals, and joining the multicast channel; and
    receive requests for further segments from the client device, receive the further segments over the multicast channel, and transmit the requested further segments to the client device over unicast.

6. The proxy according to claim 5, wherein to decide to join the multicast channel in dependence on the calculated intervals, the proxy is further adapted to compare the intervals to a threshold.

7. The proxy according to claim 5, wherein to decide to join the multicast channel in dependence on the calculated intervals, the proxy is further adapted to perform statistical analysis on the intervals, and compare result to a threshold.

8. The proxy according to claim 6, wherein the threshold is dependent on characteristics associated with the client device.

9. The proxy according to claim 5, wherein the proxy is arranged within a device, wherein the device is a gateway or a router, and wherein the device is arranged between the client device and the unicast content source.

10. The proxy according to claim 5, wherein the proxy is further adapted in operation to stop forwarding the requests for content from the client device to a unicast server when the proxy has decided to join the multicast channel.

11. The proxy according to claim 5, wherein the proxy is further adapted in operation to use a largest value of the calculated intervals to decide to join the multicast channel.

12. The method according to claim 1, wherein the proxy is arranged within a device, wherein the device is a gateway or a router, and wherein the device is arranged between the client device and the unicast content source.

13. The method according to claim 1, further comprising stopping the requests for content from the client device from being forwarded to a unicast server when the proxy has decided to join the multicast channel.

14. The method according to claim 1, further comprising using a largest value of the calculated intervals to decide to join the multicast channel.

* * * * *